US009642347B2

(12) United States Patent
Ochiai et al.

(10) Patent No.: US 9,642,347 B2
(45) Date of Patent: May 9, 2017

(54) LINE ROLLER

(71) Applicant: Shimano Inc., Sakai, Osaka (JP)

(72) Inventors: Koji Ochiai, Osaka (JP); Hirokazu Hiraoka, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/833,545

(22) Filed: Aug. 24, 2015

(65) Prior Publication Data
US 2016/0073619 A1 Mar. 17, 2016

(30) Foreign Application Priority Data

Sep. 11, 2014 (JP) .................... 2014-185464

(51) Int. Cl.
*A01K 89/01* (2006.01)

(52) U.S. Cl.
CPC .... *A01K 89/01081* (2015.05); *A01K 89/0108* (2013.01)

(58) Field of Classification Search
CPC ................ A01K 89/01; A01K 89/0108; A01K 89/01081
See application file for complete search history.

(56) References Cited

U.S. PATENT DOCUMENTS

| 5,954,284 | A | 9/1999 | Tsukihiji et al. | |
| 6,161,786 | A * | 12/2000 | Ohara | A01K 89/0108 242/157 R |
| 6,227,474 | B1 | 5/2001 | Okada | |
| 6,336,604 | B1 * | 1/2002 | Aratake | A01K 89/0108 242/231 |
| 2002/0079395 | A1 * | 6/2002 | Matsuda | A01K 89/0108 242/231 |
| 2004/0064998 | A1 * | 4/2004 | Ikuta | A01K 89/0108 43/24 |
| 2006/0027691 | A1 * | 2/2006 | Ochiai | A01K 89/0108 242/231 |
| 2009/0152389 | A1 * | 6/2009 | Ochiai | A01K 89/0108 242/231 |
| 2011/0095118 | A1 * | 4/2011 | Hiraoka | A01K 89/0108 242/230 |
| 2011/0210197 | A1 * | 9/2011 | Sugahara | A01K 89/0108 242/231 |
| 2012/0048981 | A1 * | 3/2012 | Ohara | A01K 89/0108 242/230 |
| 2013/0256438 | A1 * | 10/2013 | Hiraoka | A01K 89/0108 242/234 |

FOREIGN PATENT DOCUMENTS

| EP | 0 709 023 A1 | 5/1996 |
| JP | 2006-101704 A | 4/2006 |

OTHER PUBLICATIONS

Office Action of corresponding EP patent Application No. 15 184 534.4 dated Jan. 20, 2017.

* cited by examiner

*Primary Examiner* — Emmanuel M Marcelo
(74) *Attorney, Agent, or Firm* — Global IP Counselors, LLP

(57) ABSTRACT

A line roller for guiding fishing line onto a spool of a spinning reel, includes a bearing member, a retaining member and a guide member. The bearing member includes an inner ring, an outer ring, and a rolling body. The retaining member abuts both ends of the outer ring. The guide member includes a guide surface for guiding the fishing line, is disposed radially outside of the retaining member, and engages the retaining member.

7 Claims, 12 Drawing Sheets

LINE ROLLER

CROSS-REFERENCE TO RELATED APPLICATIONS

This application claims priority to Japanese Patent Application No. 2014-185464, filed in the Japan Patent Office on Sep. 11, 2014, the contents of which are hereby incorporated herein by reference.

BACKGROUND

Field of the Invention

The present invention relates to a line roller.

Background Information

A spinning reel comprises a spool, a rotor that comprises a pair of rotor arms, and a fishing line guiding mechanism (a so-called "bail arm") that is pivotably mounted to the distal end of the pair of rotor anus (refer to Japanese Published Unexamined Application No. 2006-101704). The fishing line guiding mechanism is a mechanism for guiding the fishing line onto the spool. This fishing line guiding mechanism comprises a bail, a pair of bail support members that support the two ends of the bail, and a line roller.

A line roller, in general, comprises a guide member, a bush, and a bearing. The guide member is attached to the bearing via the bush. There is the problem that these parts that configure a line roller can be difficult to handle; for example, the parts can be easily lost when taking them apart for maintenance due to their small sizes.

The object of the present invention is to provide a line roller that is easy to handle.

A line roller according to one aspect of the present invention is a line roller for guiding the fishing line to the spool of the spinning reel. This line roller comprises a bearing member, a retaining member, and a guide member. The bearing member comprises an inner ring, an outer ring, and a rolling body. The retaining member abuts both ends of the outer ring. The guide member comprises a guide surface on the outer peripheral side to guide the fishing line. The guide member is disposed radially outside of the retaining member and engages with the retaining member.

According to this configuration, the retaining member abuts both ends of the bearing member, thereby regulating the movement of the retaining member in the axial direction. In addition, the guide member is disposed radially outside of the retaining member, thereby also regulating the movement of the retaining member in the radial direction. Additionally, the guide member engages with the retaining member, thereby regulating the movement of the guide member in the axial direction. In this way, with the line roller according to the present invention, the bearing member, the retaining member, and the guide member are unitized, thereby making the line roller easy to handle.

Preferably, the retaining member comprises first and second retaining members, which are arranged in the axial direction. The first retaining member comprises a first tubular portion and a first abutting portion. The first tubular portion covers the outer peripheral surface of the outer ring. The first abutting portion extends radially inward from the end portion of the first tubular portion. The first abutting portion abuts the first end portion of the outer ring. The second retaining member comprises a second tubular portion and a second abutting portion. The second tubular portion covers the peripheral surface of the outer ring. The second abutting portion extends radially inward from the end portion of the second tubular portion. The second abutting portion abuts the second end portion of the outer ring.

Preferably, the guide member comprises a guiding main body portion, a holding portion, and an engagement portion. The guiding main body portion is tubular and is disposed radially outside of the first and second tubular portions. The holding portion extends radially inward from the end portion of the guiding main body. The holding portion sandwiches the first abutting portion in the axial direction with the outer ring. The engagement portion engages with a second retaining member.

Preferably, the first retaining member further comprises a tubular first seal portion. The first seal portion extends in the axial direction from the inner peripheral edge portion of the first abutting portion.

Preferably, the line roller further comprises a tabular first regulating member. The first regulating member is disposed radially inward from the first seal portion, with a space between this member and the first seal portion. At least either the outer peripheral surface of the first regulating member or the inner peripheral surface of the first seal portion is water repellent. According to this configuration, the intrusion of water into the bearing member can be prevented.

Preferably, the second retaining member further comprises a tubular second seal portion. The second seal portion extends in the axial direction from the inner peripheral edge portion of the second abutting portion.

Preferably, the line roller further comprises a tubular second regulating member. The second regulating member is disposed radially inward from the second seal portion, with a space between the member and the second seal portion. At least either the outer peripheral surface of the second regulating member or the inner peripheral surface of the second seal portion is water repellent. According to this configuration, the intrusion of water into the bearing member can be prevented.

According to the present invention, a line roller that is easy to handle can be provided.

BRIEF DESCRIPTION OF THE DRAWINGS

Referring now to the attached drawings which form a part of this original disclosure.

DETAILED DESCRIPTION OF THE EMBODIMENTS

Figure 1:
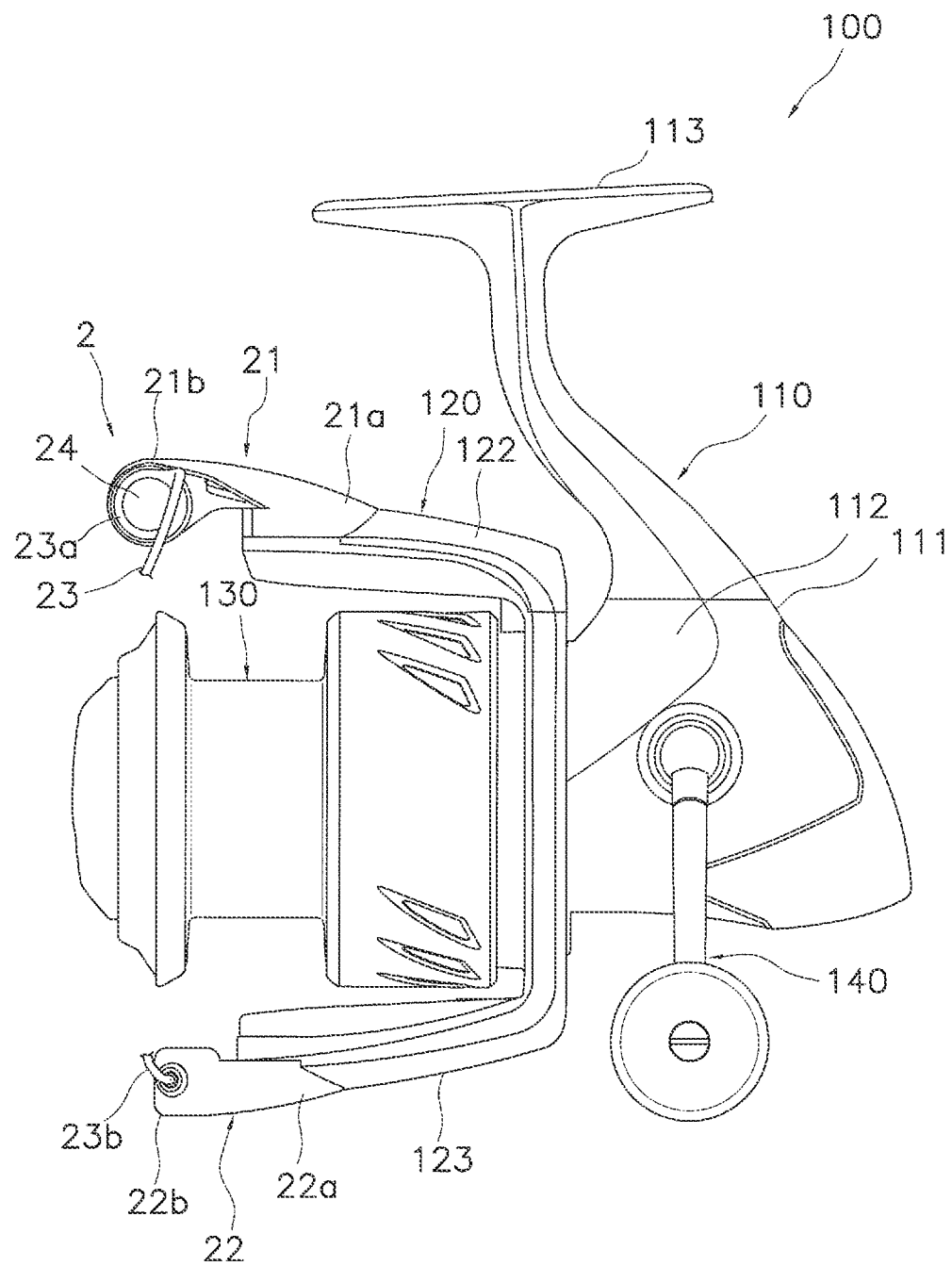
FIG. 1 is a side view of a spinning reel.
Figure 2:
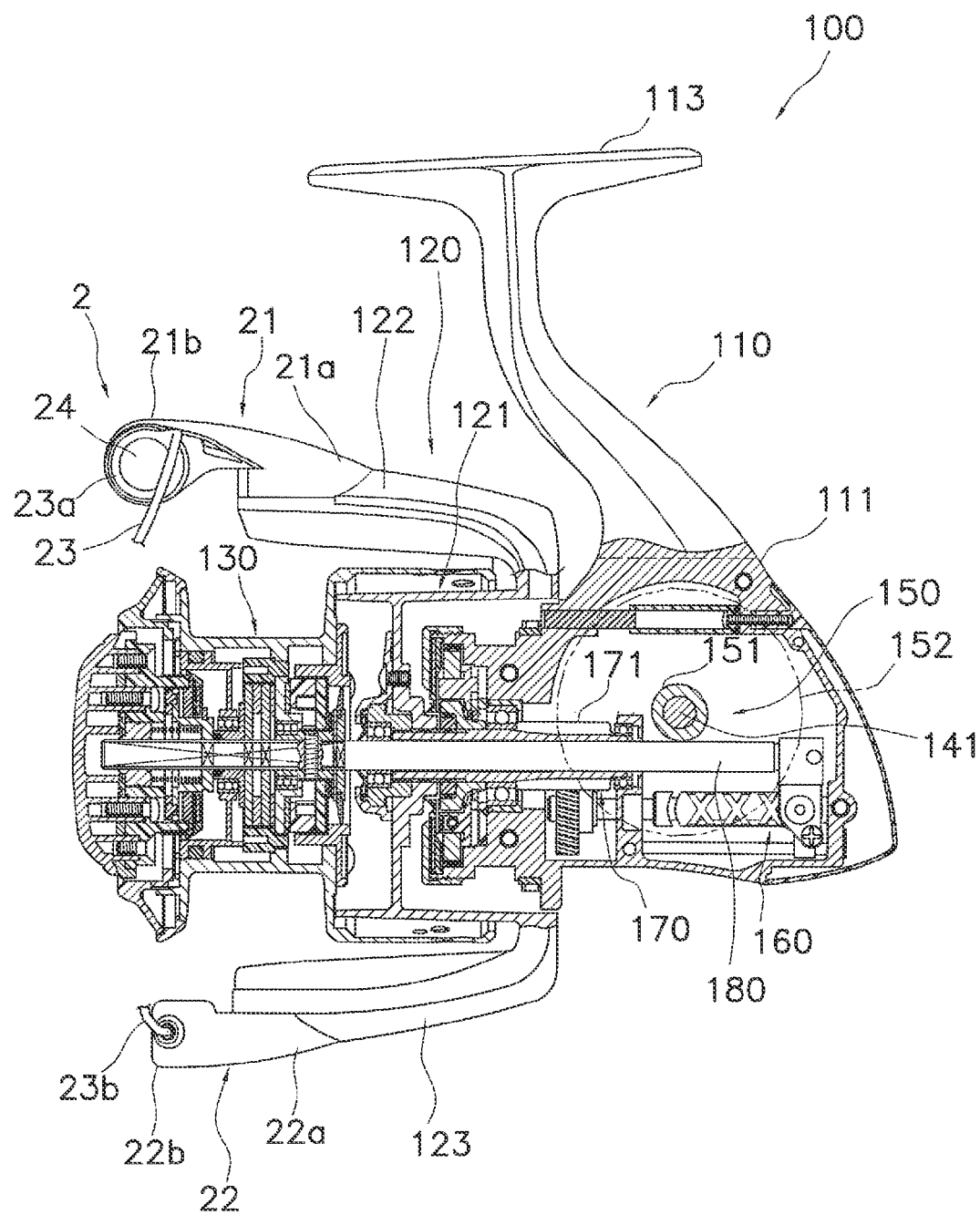
FIG. 2 is a cross-sectional view of a spinning reel.

Below, an embodiment of the spinning reel according to the present invention is explained with reference to the drawings. FIG. 1 is a side view of a spinning reel, and FIG. 2 is a cross-sectional view of the spinning reel. In the following description, "front" indicates the direction in which the line is unreeled or cast; specifically, in FIG. 1 and FIG. 2, the left is the "front."

As shown in FIG. 1, the spinning reel 100 unreels (or casts) a fishing line in a forward direction. The spinning reel 100 comprises a reel body 110, a rotor 120, a spool 130, a handle 140, and a fishing line guiding mechanism 2. As shown in FIG. 2, the spinning reel 100 further comprises a drive mechanism 150, an oscillating mechanism 160, a pinion gear 170, and a spool shaft 180.

As shown in FIG. 1, the reel body 110 comprises a case part 111 and a lid portion 112. The lid portion 112 can be detached from the case part 111. Additionally, the case part 111 comprises a mounting portion 113 that extends in the longitudinal direction. The mounting portion 113 is a portion that is mounted to the fishing rod.

As shown in FIG. 2, the reel body 110 comprises an internal space that is defined by the case part 111 and the lid portion 112, and various mechanisms are housed in the internal space. In particular, the drive mechanism 150 and the oscillating mechanism 160 are housed in the reel body 110.

The drive mechanism 150 comprises a drive shaft 151 and a drive gear 152. The drive shaft 151 is coupled with a handle shaft 141 and integrally rotates with the handle shaft 141.

The drive gear 152 is coupled with the drive shaft 151 and integrally rotates with the drive shaft 151. The drive gear 152 is a face gear that meshes with the gear portion 171 of the pinion gear 170. The drive shaft 151 and the drive gear 152 are rotated by rotating the handle 140 that is mounted to the side surface of the reel body 110, and this also rotates the pinion gear 170.

The spool shaft 180 extends forward from the inside of the reel body 110. The movement of the spool shaft 180 is reciprocated in the longitudinal direction by rotating the handle 140. In particular, the rotation of the handle 140 rotates the pinion gear 170 via the drive gear 152. Accompanying the rotation of this pinion gear 170, the movement of the oscillating mechanism 160 reciprocates the spool shaft 180 in the longitudinal direction.

The spool 130 is a member onto which the fishing line is wound. The spool 130 is supported by the distal end portion of the spool shaft 180. The movement of the spool 130 is integrally reciprocated with the spool shaft 180 in the longitudinal direction.

The pinion gear 170 is disposed on the reel body 110. In particular, the pinion gear 170 extends forward from the inside of the reel body 110. The pinion gear 170 is rotatably disposed around the spool shaft 180. The pinion gear 170 is formed in a tubular shape, and the spool shaft 180 extends inside of the pinion gear 170. The pinion gear 170 is supported by the reel body 110 via a plurality of axle bearing members.

The rotor 120 is a member for winding the fishing line onto the spool 130. The rotor 120 is fixed to the front portion of the pinion gear 170 and integrally rotates with the pinion gear 170. Therefore, the rotor 120 is non-rotatable relative to the pinion gear 170.

The rotor 120 comprises a rotor main body portion 121 and first and second rotor arms 122 and 123. The rotor main body portion 121 has a cylindrical shape. The first and second rotor arms 122 and 123 extend from the outer peripheral surface of the rotor main body portion 121 toward the front. The first rotor arm 122 and the second rotor arm 123 are disposed in opposite positions in the circumferential direction of the rotor main body portion 121.

Figure 3:
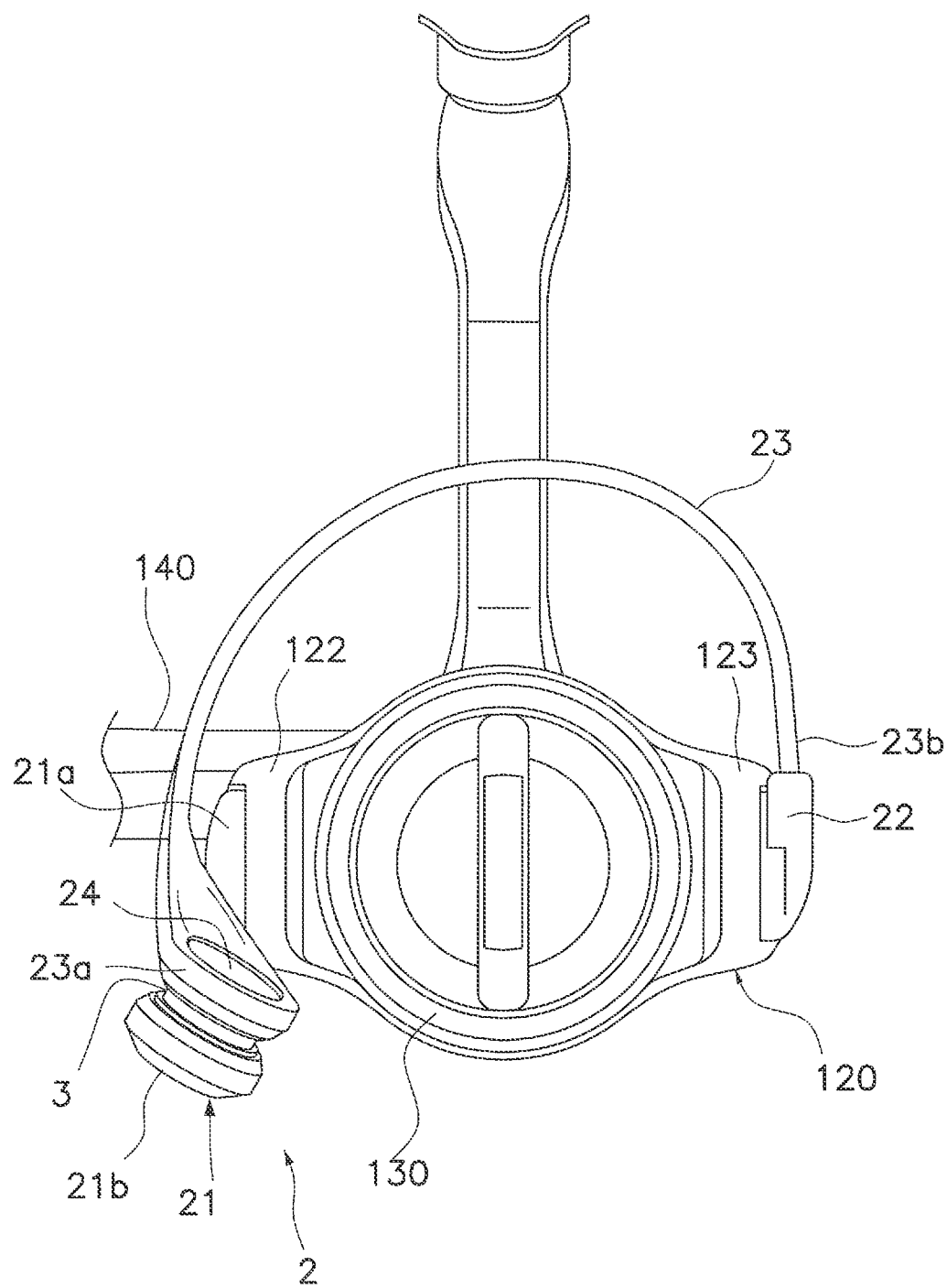
FIG. 3 is a front view of a spinning reel.

FIG. 3 is a front view of a spinning reel. As shown in FIGS. 1-3, the fishing line guiding mechanism 2 is a mechanism that guides the fishing line onto the spool 130. The fishing line guiding mechanism 2 is attached to the distal end portions of the first rotor arm 122 and the second rotor arm 123.

The fishing line guiding mechanism 2 is pivotably mounted to assume the line guiding position and the line releasing position. This fishing line guiding mechanism 2 comprises a first and a second bail support member 21 and 22, respectively, a bail 23, a support shaft 24, and a line roller 3.

The first bail support member 21 is pivotably mounted to the first rotor arm 122. Specifically, the first bail support member 21 is pivotably mounted to the outside of the distal end portion of the first rotor arm 122.

The second bail support member 22 is pivotably mounted to the second rotor arm 123. Specifically, the second bail support member 22 is pivotably mounted to the outside of the distal end portion of the second rotor arm 123.

Figure 4:
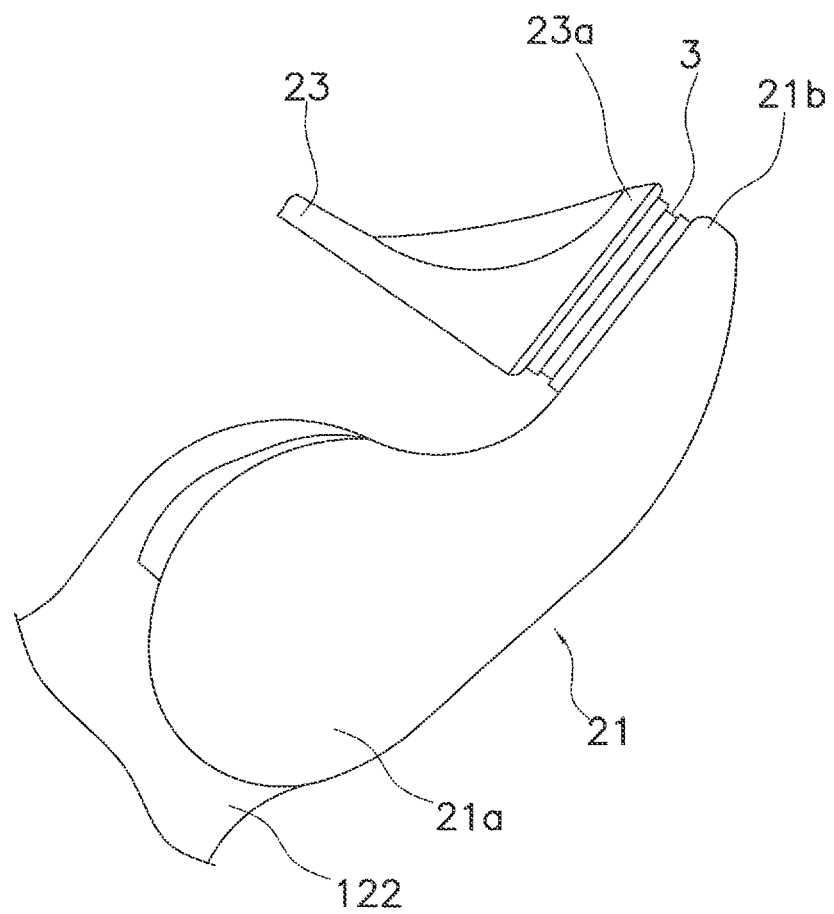
FIG. 4 is an enlarged view of a fishing line guiding mechanism.

FIG. 4 is a partially enlarged view of the fishing line guiding mechanism. As shown in FIG. 4, the first bail support member 21 comprises a first end portion 21a and a second end portion 21b. The first end portion 21a is pivotably mounted to the first rotor arm 122. The second end portion 21b of the first bail support member 21 supports the first end portion 23a of the bail 23 via the support shaft 24 (refer to FIG. 5).

As shown in FIG. 1 and FIG. 2, the second bail support member 22 comprises a first end portion 22a and a second end portion 22b. The first end portion 22a is pivotably mounted to the second rotor arm 123. The second end portion 22b supports the second end portion 23b of the bail 23.

As shown in FIG. 3, the bail 23 is a member curved in a substantially U-shape and is made of a stainless alloy. The bail 23 is curved to protrude outwards along the outer peripheral surface of the spool 130. This bail 23 comprises a cover portion 23c at the first end portion 23a.

This cover portion 23c is supported by the first bail support member 21 via the support shaft 24. The second end portion 23b of the bail 23 is also supported by the second bail support member 22. When the fishing line guiding mechanism returns to the line guiding position from the line releasing position, the bail 23 guides the fishing line to the line roller 3 via the cover portion 23c.

Figure 5:
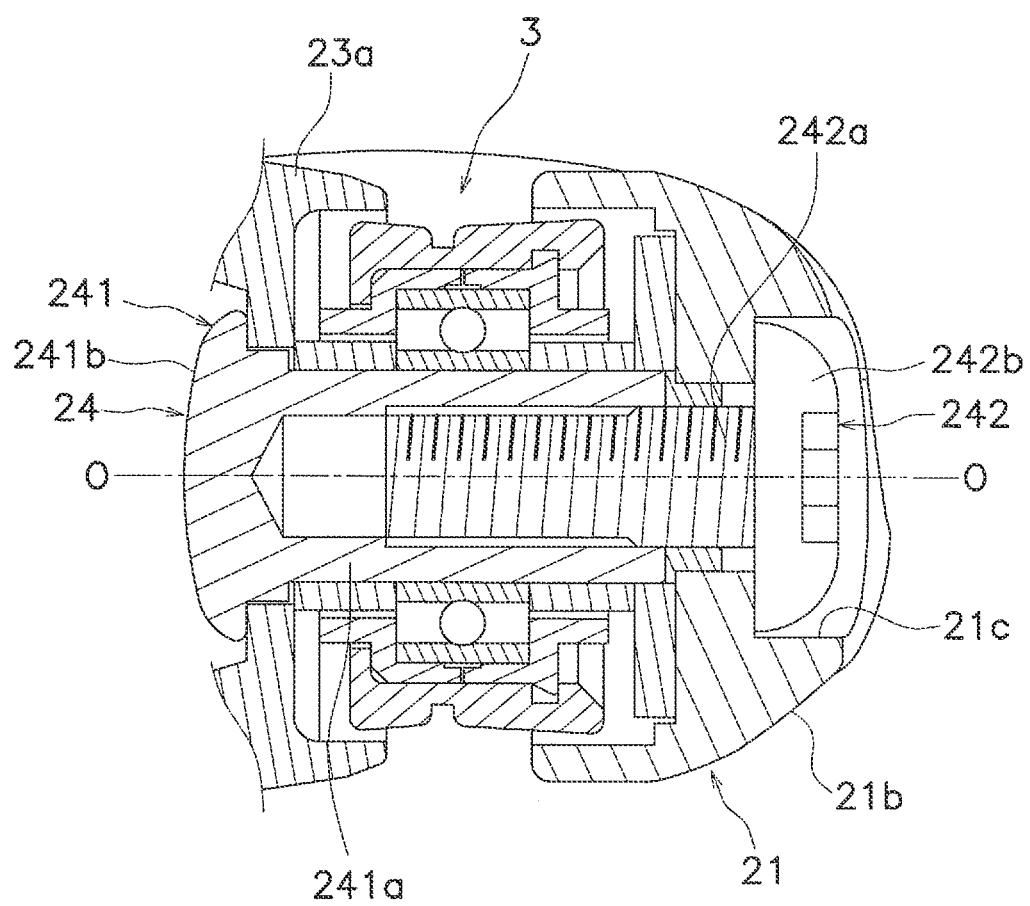
FIG. 5 is a cross-sectional view of a fishing line guiding mechanism.

FIG. 5 is a cross-sectional view of a fishing line guiding mechanism. The left and right direction in FIG. 5 represents the axial direction. Meanwhile, in the following explanation, the axial direction refers to the direction in which the rotational axis O of the line roller 3 extends. That is, the axial direction refers to the direction in which the supporting shaft 24 extends. Additionally, the radial direction refers to the radial direction of a circle with the rotational axis as the center. The circumferential direction also refers to the circumferential direction of a circle with the rotational axis O as the center.

As shown in FIG. 5, a through-hole 21c is formed at the second end portion 21b of the first bail support member 21. The through-hole 21c is a through-hole with steps. Support shaft 24 extends through this through-hole 21c.

The support shaft 24 extends between the first bail support member 21 and the cover portion 23c of the bail 23. The support shaft 24 comprises a tubular portion 241 and a bolt portion 242. The tubular portion 241 comprises a shaft portion 241a and a head portion 241b. The shaft portion 241a is cylindrically shaped with a female threaded portion formed on the inner peripheral surface. The head portion 241b has a larger diameter than the shaft portion 241a. With the head portion 241b abutting the cover portion 23c, the movement of the tubular portion 241 in the axial direction is regulated.

The bolt portion 242 comprises a shaft portion 242a and a head portion 242b. The shaft portion 242a is cylindrically shaped with a male threaded portion formed on the outer peripheral surface. Accordingly, the bolt portion 242 screws onto the tubular portion 241. The head portion 242b has a larger diameter than that of the shaft portion 242a. With the head portion 242b abutting the second end portion 21b of the first bail support member 21, the movement of the bolt portion 242 in the axial direction is regulated.

Figure 6:
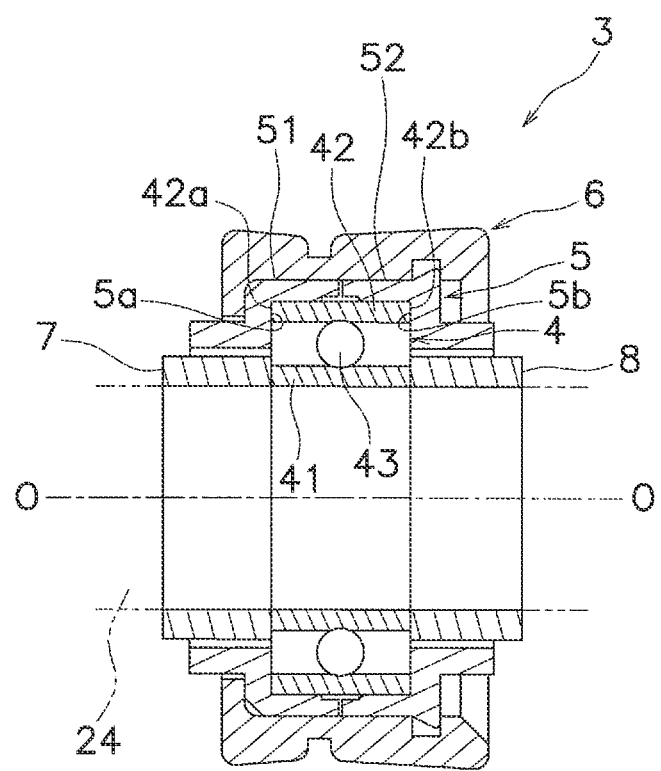
FIG. 6 is a cross-sectional view of a line roller.

FIG. 6 is a cross-sectional view of a line roller. The line roller 3 is a member for guiding the fishing line onto the spool 130 of the spinning reel 100. As shown in FIG. 6, the line roller 3 comprises a bearing member 4, a support member 5, and a guide member 6. In addition, the line roller 3 further comprises a first regulating member 7 and a second regulating member 8.

The bearing member 4 comprises an inner ring 41, an outer ring 42, and a plurality of rolling bodies 43. The inner ring 41 is cylindrically shaped. The support shaft 24 fits in the inner ring 41. Accordingly, the inner ring 41 does not rotate with respect to the support shaft 24.

The outer ring 42 is cylindrically shaped and has a larger diameter than the inner ring 41. The outer ring 42 is disposed radially outside of the inner ring 41. Each rolling body 43 is disposed between the inner ring 41 and the outer ring 42. Each rolling body 43 is disposed at an interval from the others in the circumferential direction. The inner ring 41 and the outer ring 42 are formed from metal, for instance, from stainless steel.

The first and second regulating members 7 and 8 are disposed to be adjacent to the bearing member 4 in the axial direction. Specifically, the first regulating member 7, the bearing member 4, and the second regulating member 8 are arranged in that order in the axial direction. That is, the bearing member 4 is disposed between the first regulating member 7 and the second regulating member 8 in the axial direction.

The first and second regulating members 7 and 8 are cylindrically shaped. The inner diameters of the first and second regulating members 7 and 8 are substantially equal to the inner diameter of the hearing member 4. The support member 24 extends through the first and second regulating members 7 and 8.

The first and second regulating members 7 and 8 regulate the movement of the bearing member 4 in the axial direction. Specifically, the first regulating member 7 is disposed between the cover portion 23c of the bail 23 and the bearing member 4 in the axial direction. Accordingly, the first regulating member 7 regulates the movement of the bearing member 4 to the cover portion 23c side (movement to the left in FIG. 6). Additionally, the second regulating member 8 is disposed between the second end portion 21b of the first bail support member 21 and the bearing member 4 in the axial direction. Accordingly, the second regulating member 8 regulates the movement of the bearing member 4 to the first bail support member 21 side (movement to the right in FIG. 6).

The first regulating member 7 is disposed radially inside of the first seal portion 51c described below, with a space between this member and the first seal portion 51c. The second regulating member 8 is disposed radially inside of the second seal portion 52c described below, with a space between this member and the second seal portion 52c.

The outer peripheral surfaces of the first and second regulating members 7 and 8 preferably are water repellent. For example, the contact angle of the outer peripheral surfaces of the first and second regulating members 7 and 8 and water drops adhered to the outer peripheral surfaces thereof is greater than 90 degrees.

In order to impart water repellency to the outer peripheral surfaces of the first and second regulating members 7 and 8, for example, the outer peripheral surfaces of the first and second regulating members 7 and 8 may be coated with water repellent material, or the first and second regulating members 7 and 8 may be formed from water repellent materials. Water repellent materials are, for example, materials containing fluorine resin or silicone resin.

The retaining member 5 abuts both ends of the outer ring 42. Specifically, the retaining member 5 comprises two shoulders 5a, and 5b. Each shoulder 5a, 5b is disposed at an interval in the axial direction. Each shoulder 5a, 5b is formed across in the circumferential direction. One shoulder 5a abuts the first end portion 42a of the outer ring 42, and the other shoulder 5b abuts the second end portion 42b of the outer ring 42. Additionally, the retaining member 5 is disposed to cover the outer peripheral surface of the bearing member 4.

Figure 7:
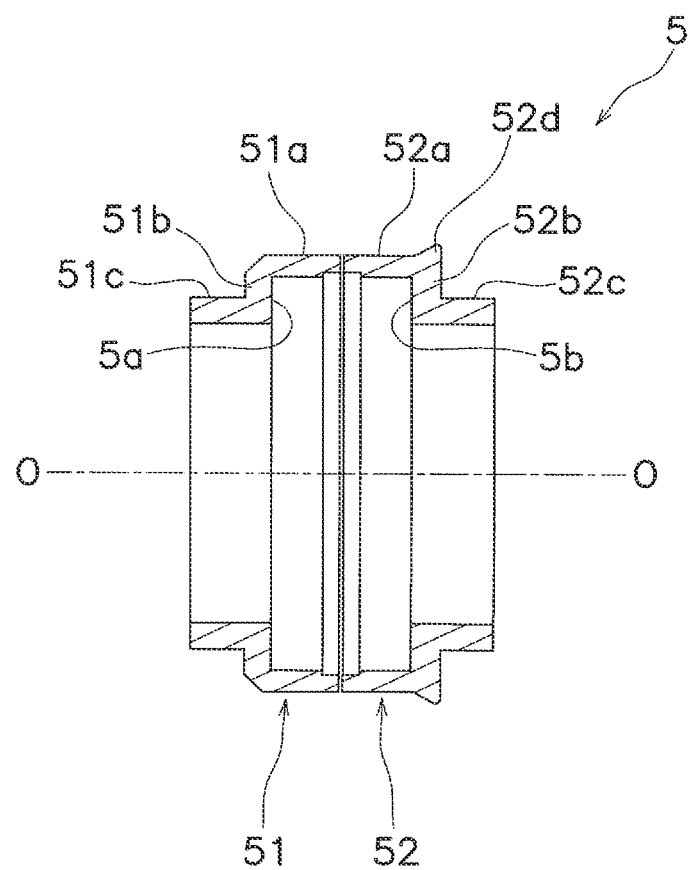
FIG. 7 is a cross-sectional view of a retaining member.

FIG. 7 is a cross-sectional view of the retaining member 5. As shown in FIG. 7, the retaining member 5 comprises a first and a second retaining member 51 and 52, respectively, arranged in the axial direction. The first retaining member 51 and the second retaining member 52 are separate members. The first retaining member 51 comprises the first shoulder 5a, and the second retaining member 52 comprises the second shoulder 51). The retaining member 5, that is, the first and second retaining members 51 and 52, are made of resin. Although not particularly limited thereto, for example, the first and second retaining members 51 and 52 are formed by POM (polyacetal) resin and the like.

The first retaining member 51 comprises a first tubular portion 51a and a first abutting portion 51b. In addition, the first retaining member 51 comprises a first seal portion 51c.

The first tubular portion 51a is configured to cover the outer peripheral surface of the outer ring 42. The first tubular portion 51a is cylindrically shaped. When the first retaining member 51 is mounted to the bearing member 4, the inner peripheral surface of the first tubular portion 51a comes in contact with the outer peripheral surface of the bearing member 4. Preferably, the bearing member 4 fits the first tubular portion 51a. Accordingly, the first retaining member 51 and the outer ring 42 are integrally rotated.

The first abutting portion 51b extends radially inward from the end portion of the first tubular portion 51a. When the first retaining member 51 is mounted to the bearing member 4, the first abutting portion 51b abuts the first end portion 42a of the outer ring 42. The first abutting portion 51b is annular. The inner diameter of the first abutting portion 51b is smaller than the inner diameter of the outer ring 42 and is larger than the outer diameter of the inner ring 41. The outer peripheral edge portion of the first abutting portion 51b couples with the first tubular portion 51a, and the inner peripheral edge portion of the first abutting portion 51b couples with the first seal portion 51c.

The first seal portion 51c extends in the axial direction from the inner peripheral edge portion of the first abutting portion 51b. Specifically, the first seal portion 51c extends away from the first tubular portion 51a in the axial direction, from the inner peripheral edge portion of the first abutting portion 51b. That is, the first tubular portion 51a and the first seal portion 51c extend in axially opposite directions with reference to the first abutting portion 51b. The first seal portion 51c is tubular. Specifically, the first seal portion 51c is cylindrically shaped.

The first seal portion 51c is disposed at an interval with the first regulating member 7 in the radial direction. That is, the inner diameter of the first seal portion 51c is larger than the outer diameter of the first regulating member 7. Accordingly, when the first retaining member Si rotates around the rotational axis O, the first seal portion 51c substantially does not come in contact with the first regulating member 7. The inner peripheral surface of the first seal portion 51c and the outer peripheral surface of the first regulating member 7 are facing each other.

The second retaining member 52 comprises a second tubular portion 52a and a second abutting portion 52b. In addition, the second retaining member 52 further comprises a second seal portion 52c and an engagement protrusion 52d.

The second tubular portion 52a is configured to cover the outer peripheral surface of the outer ring 42. The second tubular portion 52a is cylindrically shaped. When the second retaining member 52 is mounted to the bearing member 4, the inner peripheral surface of the second tubular portion 52a is in contact with the outer peripheral surface of the bearing member 4. Preferably, the bearing member 4 fits the second tubular portion 52a. Accordingly, the second retaining member 52 and the outer ring 42 are integrally rotated. Additionally, the first tubular portion 51a covers the outer peripheral surface on the first end portion 42a side of the outer ring 42, and the second tubular portion 52a covers the outer peripheral surface on the second end portion 42b side of the outer ring 42.

The second abutting portion 52b extends radially inward from the end portion of the second tubular portion 52a. When the second retaining member 52 is mounted to the bearing member 4, the second abutting portion 52b abuts the second end portion 42b of the outer ring 42. The second abutting portion 52b is annular. The inner diameter of the second abutting portion 52b is smaller than the inner diameter of the outer ring 42 and is larger than the outer diameter of the inner ring 41. The outer peripheral edge portion of the second abutting portion 52b couples with the second tubular portion 52a, and the inner peripheral edge portion of the second abutting portion 52b couples with the second seal portion 52c.

The second seal portion 52c extends in the axial direction from the inner peripheral edge portion of the second abutting portion 52b. Specifically, the second seal portion 52c extends away from the second tubular portion 52a in the axial direction, from the inner peripheral edge portion of the second abutting portion 52b. That is, the second tubular portion 52a and the second seal portion 52c extend in axially opposite directions with reference to the second abutting portion 52b. The second seal section 52c is tubular. Specifically, the second seal section 52c is cylindrically shaped.

The second seal portion 52c is disposed at an interval with the second regulating member 8 in the radial direction. That is, the inner diameter of the second seal portion 52c is larger than the outer diameter of the second regulating member 8. For this reason, when the second retaining member 52 rotates around the rotational axis O, the second seal portion 52c substantially does not come in contact with the second regulating member 8. The inner peripheral surface of the second seal portion 52c and the outer peripheral surface of the second regulating member 8 are facing each other.

The engagement protrusion 52d protrudes radially outside. Specifically, the engagement protrusion 52d protrudes radially outside of the second tubular portion 52a. The engagement protrusion 52d is an annular shape that extends in the circumferential direction. The engagement protrusion 52d may be intermittently formed along the circumferential direction.

The engagement protrusion 52d is inclined so that the height in the axial direction increases as the first retaining member 51 moves farther away.

Figure 8:
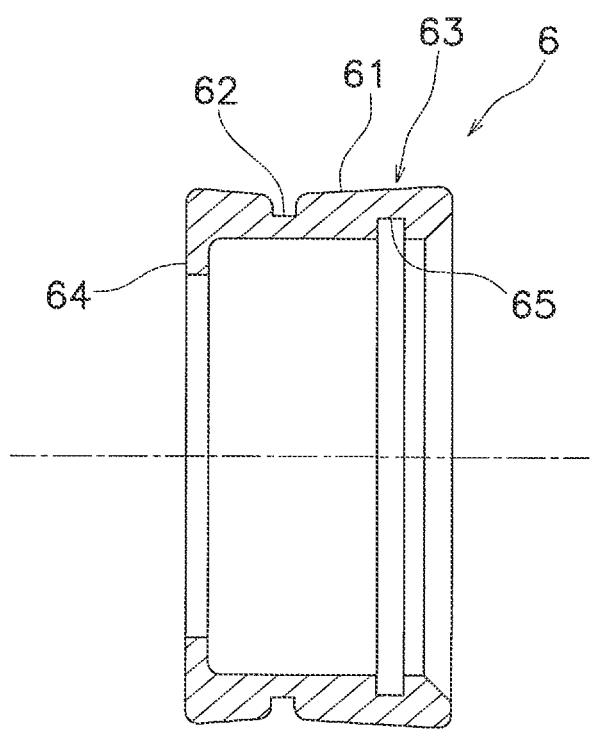
FIG. 8 is a cross-sectional view of a guide member.

FIG. 8 is a cross-sectional view of the guide member. As shown in FIG. 8, the guide member 6 is tubular. While not particularly limited, the guide member 6 is, for example, made of metal. For example, the guide member 6 is formed from stainless steel.

The guide member 6 is disposed radially outside of the retaining member 5. Specifically, the guide member 6 covers the outer peripheral surface of the retaining member 5. That is, the retaining member 5 is inserted inside of the guide member 6. The guide member 6 engages with the retaining member 5 in a state in which the retaining member 5 is inserted inside of the guide member 6 (refer to FIG. 6). That is, the guide member 6 engages with the retaining member 5 so as not to move in the axial direction with respect to the retaining member 5.

The guide member 6 comprises a guide surface 61 for guiding a fishing line onto the outer peripheral side. Specifically, an annular groove 62 that extends in the circumferential direction is formed on the guide surface 61. In particular, this groove 62 is formed in a position that is further on the first retaining member 51 side than the center of the guide surface 61 in the axial direction. The guide surface 61 is inclined from the both ends to the groove 62 so as to guide a fishing line to the groove 62.

The guide member 6 comprises a tubular guiding main body portion 63 and a holding portion 64. The outer peripheral surface of the guiding main body portion 63 is the guide surface 61 described above. The guiding main body portion 63 is disposed radially outside of the first and second tubular portions 51a and 52a in a state in which the guide member 6 is mounted to the retaining member 5.

Specifically, the guiding main body portion 63 covers the outer peripheral surfaces of the first and second tubular portions 51a and 52a. The inner peripheral surface of the guiding main body portion 63 is in contact with the outer peripheral surfaces of the first and second tubular portions 51a, 52a. The first and second tubular portions 51a, 52a are held by the outer ring 42 and the guiding main body portion 63 in the radial direction.

An engagement recess 65 is formed on the inner peripheral surface of the guiding main body portion 63. This engagement recess 65 corresponds to the engagement portion of the present invention. The engagement recess 65 is an annular shape that extends in the circumferential direction. When the guide member 6 is mounted to the retaining member 5, the engagement recess 65 engages with the second retaining member 52. In particular, the engagement protrusion 52d and the engagement recess 65 of the second retaining member 52 engage with each other. The movement of the guide member 6 in the axial direction with respect to the retaining member 5 is thereby regulated.

The holding portion 64 extends radially inward from the end portion of the guiding main body portion 63. When the guide member 6 is mounted to the retaining member 5, the holding portion 64 sandwiches the first abutting portion 51b in the axial direction with the outer ring 42 (refer to FIG. 6).

That is, the holding portion 64 sandwiches the first abutting portion 51b with the outer ring 42.

Since the holding portion 64 abuts the first abutting portion 51b, the movement of the guide member 6 to the second retaining member 52 side (right side in FIG. 6) in the axial direction is regulated. Additionally, since the guide member 6 engages with the second retaining member 52, the movement of the guide member to the first retaining member 51 side (left side in FIG. 6) is regulated. As a result, the movement of the guide member 6 in the axial direction is regulated.

Figure 9:
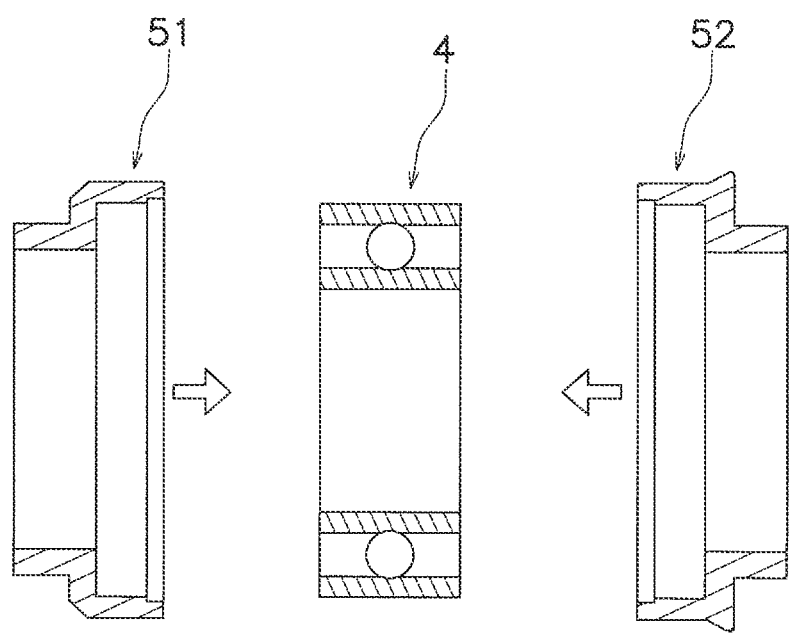
FIG. 9 is a diagram that shows the assembly method of a line roller.

Next, the assembly method of the line roller 3 will be described. As shown in FIG. 9, first, the retaining member 5 is mounted to the bearing member 4. In particular, the first retaining member 51 is mounted to the bearing member 4 from the left side of FIG. 9, and the second retaining member 52 is mounted to the bearing member 4 from the right side in FIG. 9. That is, the retaining member 5 is mounted to the bearing member 4 so as to sandwich the bearing member 4 with the first retaining member 51 and the second retaining member 52.

Figure 10:
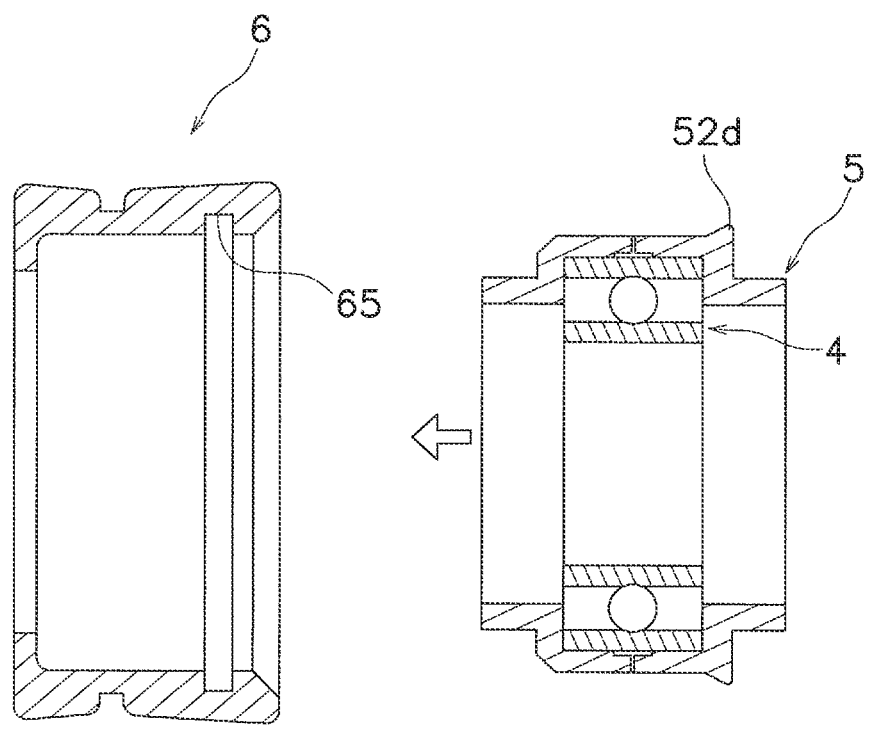
FIG. 10 is a diagram that shows the assembly method of a line roller.
Figure 11:
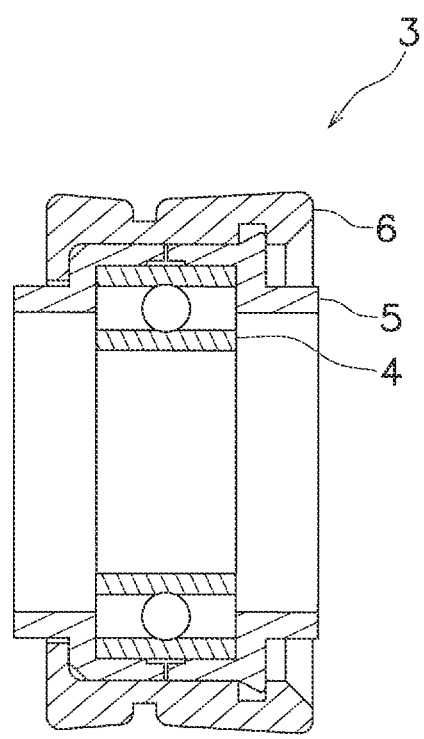
FIG. 11 is a cross-sectional view of the unitized portion of a line roller.

Next, as shown in FIG. 10, the retaining member 5, which is mounted to the bearing member 4, is inserted inside of the guide member 6. Specifically, as shown in FIG. 10, the retaining member 5 is inserted from the right side in FIG. 10 with respect to the guide member 6. Specifically, the retaining member 5, which is mounted to the bearing member 4, is inserted inside of the guide member 6 until the engagement protrusion 52d engages with the engagement recess 65. With the above, a unitized line roller 3 is realized, as shown in FIG. 11. The first and the second regulating members 7, 8 are not unitized. That is, the first and the second regulating members 7, 8 are also attached to the support shaft 24 when attaching this unitized controller 3 to the support shaft 24.

According to the line roller 3 of the present embodiment described above, the retaining member 5 abuts both ends of the bearing member 4, thereby regulating the movement of the retaining member in the axial direction. In addition, the guide member 6 is disposed radially outside of the retaining member 5, thereby also regulating the movement of the retaining member 5 in the radial direction. Additionally, the guide member 6 engages with the retaining member 5, thereby regulating the movement of the guide member 6 in the axial direction. In this way, since the bearing member 4, the retaining member 5, and the guide member 6 are unitized in the line roller 3, the line roller 3 is easy to handle.

Modified Example

Although each embodiment of the present invention has been presented heretofore, the present invention is not limited to the embodiments, and various modifications can be made without departing from the scope of the invention Modified Example 1

In the above-described embodiment, the outer peripheral surface comprised a first regulating member 7, but the present invention is not limited thereto. For example, at least either the outer peripheral surface of the first regulating member 7 or the inner peripheral surface of the first seal portion 51c may be water repellent. Additionally, both the outer peripheral surface of the first regulating member 7 and the inner peripheral surface of the first seal portion 51c may not be water repellent.

Modified Example 2

The first and the second regulating members 7 and 8 may be omitted. In this case, the inner peripheral surface of the first and the second seal portions 51c, 52c of the retaining member 5 opposes the support shaft 24. Additionally, the inner peripheral surfaces of the first and the second seal portions 51c, 52c are preferably water repellent.

Modified Example 3

The retaining member 5 may not comprise the first and second seal portions 51c, 52c.

Modified Example 4

Figure 12:
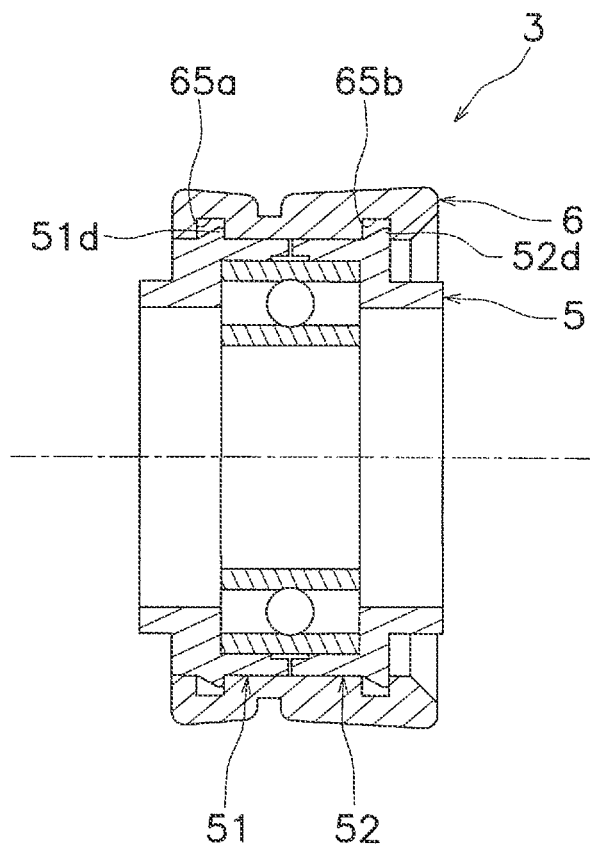
FIG. 12 is a cross-sectional view of a line roller according to a fourth modified example.

As shown in FIG. 12, the guide member 6 may engage with each of the first and the second retaining members 51 and 52. That is, the guide member 6 comprises first and second engagement recesses 65a and 65b. The first and second engagement recesses 65a and 65b are formed on the inner peripheral surface of the guide member 6. The first and the second engagement recesses 65a and 65b have annular shapes that extend along in the circumferential direction.

The first retaining member 51 comprises a first engagement protrusion 51d, and the second retaining member 52 comprises a second engagement protrusion 52d. The first engagement protrusion 51d engages with the first engagement recess 65a, and the second engagement protrusion 52d engages with the second engagement recess 65b. In this case, the guide member 6 may not comprise a holding portion.

What is claimed is:

1. A line roller for guiding fishing line onto a spool of a spinning reel, comprising:
    a bearing member comprising an inner ring, an outer ring, and a rolling body, the outer ring including first and second longitudinal end surfaces, the first and second longitudinal end surfaces extending transverse to a rotational axis of the line roller,
    a retaining member contacting both the first and second longitudinal end surfaces of the outer ring; and
    a guide member comprising a guide surface configured to guide the fishing line, being disposed radially outside of the retaining member and rotating with the retaining member, and engaging the retaining member.

2. A line roller for guiding fishing line onto a spool of a spinning reel, comprising:
    a bearing member comprising an inner ring, an outer ring, and a rolling body;
    a retaining member abutting both ends of the outer ring, the retaining member comprising a first retaining member and a second retaining member arranged in an axial direction,
    the first retaining member comprising
        a first tubular portion covering an outer peripheral surface of the outer ring, and
        a first abutting portion extending radially inward from an end portion of the first tubular portion and abutting a first end portion of the outer ring, and
    the second retaining member comprising
        a second tubular portion covering the outer peripheral surface of the outer ring, and
        a second abutting portion extending radially inward from an end portion of the second tubular portion and abutting a second end portion of the outer ring; and
    a guide member comprising a guide surface configured to guide the fishing line, being disposed radially outside of the retaining member, and engaging the retaining member.

3. The line roller recited in claim 2, wherein
the guide member comprises
- a tubular guiding main body portion disposed radially outside of the first and second tubular portions,
- a holding portion extending radially inward from an end portion of the guiding main body portion and sandwiching the first abutting portion in an axial direction with the outer ring, and
- an engagement portion engaging the second retaining member.

4. The line roller recited in claim 2, wherein
the first retaining member further comprises a first seal portion extending in an axial direction from an inner peripheral edge portion of the first abutting portion.

5. The line roller recited in claim 4, further comprising
a first regulating member disposed radially inward from the first seal portion, with a space therebetween, and
at least either an outer peripheral surface of the first regulating member or an inner peripheral surface of the first seal portion is water repellent.

6. The line roller recited in claim 2, wherein
the second retaining member further comprises a tubular second seal portion extending in an axial direction from an inner peripheral edge portion of the second abutting portion.

7. The line roller recited in claim 6, wherein
a second regulating member disposed radially inward from the second seal portion, with a space therebetween, and
at least either an outer peripheral surface of the second regulating member or an inner peripheral surface of the second seal portion is water repellent.

* * * * *